June 22, 1926.
H. M. PLOTNER
1,589,660
GASOLINE TANK VALVE
Filed June 25, 1925
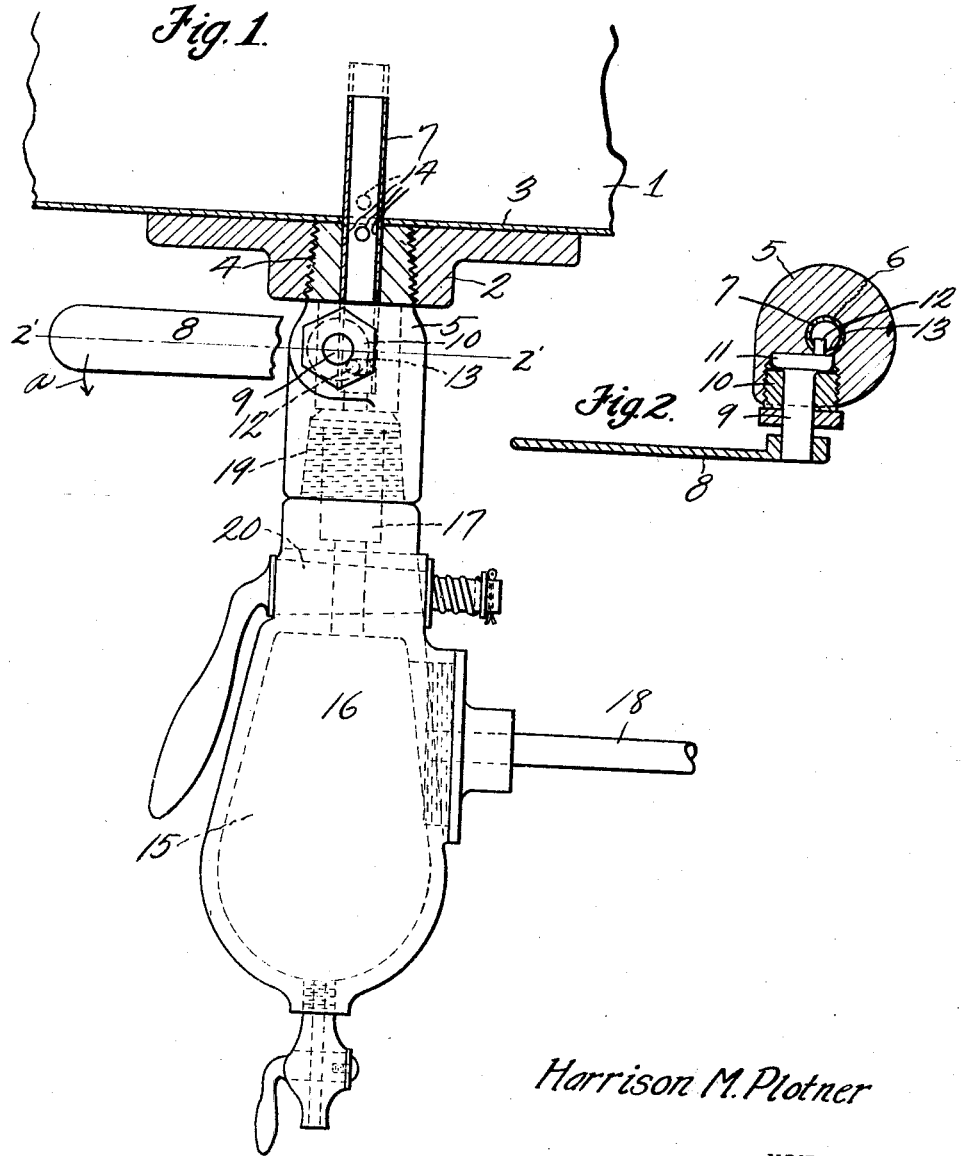
Harrison M. Plotner
INVENTOR.
BY George J. Utsch
ATTORNEY.

Patented June 22, 1926.

UNITED STATES PATENT OFFICE.

HARRISON M. PLOTNER, OF MISHAWAKA, INDIANA.

GASOLINE-TANK VALVE.

Application filed June 25, 1925. Serial No. 39,510.

The invention relates to tank valves for gasoline tanks of motor driven vehicles, and has for its object to provide a device of this character wherein gasoline from the tank will drain therefrom to a predetermined level thereby warning the operator of the automobile that the engine has consumed all except the reserve supply of gasoline, and when he starts to use the reserve supply, it will be necessary to proceed to a gasoline filling station where an additional supply of gasoline can be obtained. The warning signal is given to the operator of the automobile by the stopping of the engine.

A further object is to provide a reserve supply valve for gasoline tanks of motor driven vehicles comprising a casing having a pipe leading to a carbureter, said casing extending upwardly through the tank and provided with a slidable tubular member actuated through the medium of a shaft having a handle member which shaft is provided with an eccentrically disposed pin extending into an elongated aperture in the tubular member, and by means of which handle member and the eccentrically mounted pin, the tubular member may be moved upwardly for positioning apertures therein above the bottom of the tank, thereby allowing the reserve supply of gasoline to drain from the tank.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a side elevation of the device, showing a portion thereof and a portion of gasoline tank in section.

Figure 2 is a horizontal sectional view taken on line 2—2 of Figure 1.

Referring to the drawing, the numeral 1 designates a portion of a conventional form of gasoline tank of the type used on motor driven vehicles and 2 a flanged member carried by the under side of the bottom 3 of the tank. Flanged member 2 is provided with a tapered opening 4, in which is threaded a valve casing 5, and vertically slidable in a bearing 6 of the casing 5 is a tubular member 7. The tubular member 7 extends upwardly into the tank 1 above the bottom 3 thereof, and when in the full line position shown in Figure 1 allows gasoline to be drained from the tank until it reaches the level of the upper end of the slidable tubular member 7, and when the supply of gasoline to the carbureter and engine is cut off, the operator will be warned that the supply of gasoline has reached a level where it will be necessary for him to replenish the supply of gasoline, however there would still be a reserve supply of gasoline, sufficient to reach a filling station, at which time the operator will move the lever 8 in the direction of the arrow $a$, which will rock the shaft 9 carried by the bushing 10, which is threaded into the side of a casing 5. The inner end of the shaft 9 is provided with a disc 11, which disc, at one side of the axis thereof, is provided with an eccentric pin 12, which extends into the horizontally elongated slots 13 in one side of the tubular member 7. As the handle member 8 is moved in the direction of the arrow $a$, the pin 12 will move the tubular member 7 upwardly until the apertures 14 therein are above the bottom 3 of the tank, therefore it will be seen that the reserve supply of gasoline will be allowed to drain from the tank through the apertures 14 and the tubular member into the sediment chamber 15 of a casing 16, and which chamber 15 is in communication with the tube 7 through the port 17. The gasoline passes from the sediment chamber 15 through the pipe 18 to the carbureter of the engine. Casing 16 is threaded at 19 into the lower end of the casing 5, and is provided with a valve 20 whereby the amount of gasoline may be varied in the usual manner, or cut off.

Casing 5 is constructed in a manner whereby it may be easily and quickly applied to a tank as at present constructed by simply removing the casing 16 therefrom which is of a conventional structure, and interposing the casing 5 between the tank and the casing 16, therefore it will be seen that the device may be cheaply manufactured and may be easily and quickly applied to a gasoline tank without modifying the construction thereof. It will also be seen that the movable parts are reduced to a minimum, and by providing the sliding tube 7 the valve seats and the like are obviated and a maximum size discharge passage is provided which can not become clogged. It will also be seen by providing a plurality of ports or apertures 14 which have an area equal to the passage through the tubular member 17, during the use of the reserve supply of gasoline, as much gasoline will flow to the carbureter as when the main supply of gasoline is being used.

The invention having been set forth what is claimed as new and useful is:

A tank valve comprising a casing connected to the bottom of a tank, a tubular member slidably mounted in a bearing of the casing and extending upwardly into the tank and provided with apertures spaced from its upper end, a rotatable shaft rotatably mounted in a bearing of the casing at substantially a right angle to the tubular member, an integral disc carried by said shaft in a chamber of the casing, a bushing surrounding the shaft and threaded into the chamber of the casing and of greater diameter than the disc, an eccentrically mounted pin carried by said disc and extending into an elongated aperture in the tubular member and a handle member carried by said shaft.

In testimony whereof I affix my signature.

HARRISON M. PLOTNER.